J. W. F. GILREATH.
Guano-Distributer and Seed-Planter.
No. 217,090. Patented July 1, 1879.
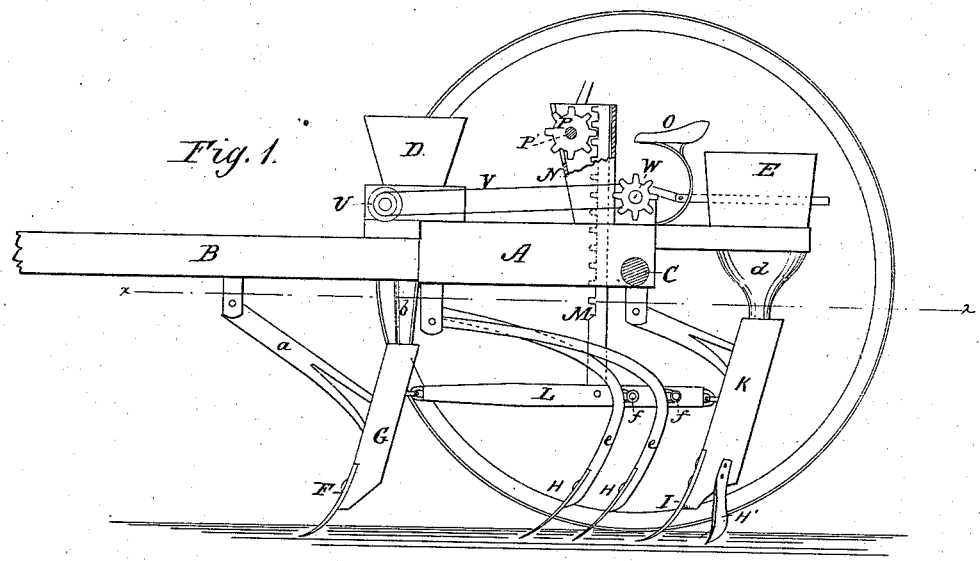
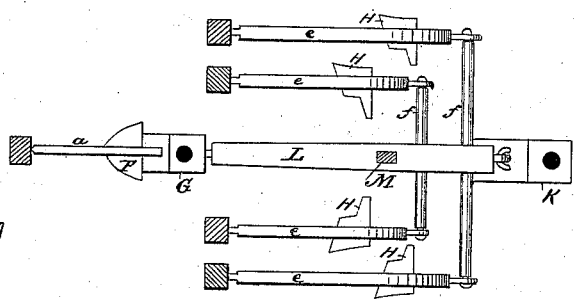
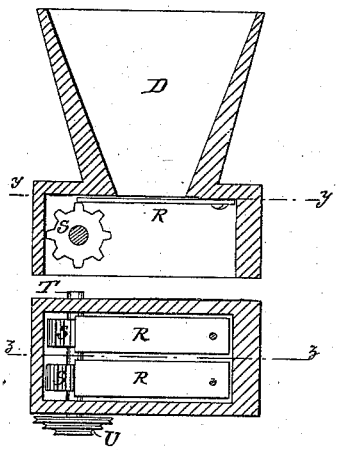
WITNESSES:
W. W. Hollingsworth
Amos W. Hart
INVENTOR:
J. W. F. Gilreath
BY
ATTORNEYS.

UNITED STATES PATENT OFFICE.

JOHN W. F. GILREATH, OF CASSVILLE, GEORGIA.

IMPROVEMENT IN GUANO-DISTRIBUTER AND SEED-PLANTER.

Specification forming part of Letters Patent No. 217,090, dated July 1, 1879; application filed April 12, 1879.

*To all whom it may concern:*

Be it known that I, JOHN WILLIAM FLETCHER GILREATH, of Cassville, in the county of Bartow and State of Georgia, have invented a new and Improved Guano-Distributer and Seed-Planter; and I do hereby declare that the following is a full, clear, and exact description of the same.

My invention is an improvement in the class of machines which are adapted for both distributing guano, or other fertilizer, and depositing and covering seed simultaneously. It is more particularly intended and adapted for planting cotton-seed.

The improvement consists in the construction and arrangement of parts whereby the guano and seed conducting tubes or spouts, and also the furrow-openers and seed-coverers, are simultaneously raised and lowered by the same means.

In the accompanying drawings, forming part of this specification, Figure 1 is a side view of the machine, except that one wheel is detached. Fig. 2 is a horizontal section on line $x$ $x$, Fig. 1. Fig. 3 is a detail plan view, showing the means for imparting motion to the guano and seed discharge devices located in respective hoppers. Fig. 4 includes both a vertical and horizontal section of the guano-hopper.

The frame A, tongue B, and axle C of the machine are rigidly connected. The guano-hopper D is located on the front end, and the cotton-seed hopper E on the rear end, of the frame A.

The furrow-opener shovel F is attached to a tube, G, having an arm, $a$, which is hinged to the tongue B. A flexible tube, $b$, conveys the guano from the hopper D to the said tube G.

In rear of, and laterally from, the furrow-opener are hinged the four plows H, which cover the guano and form a bed or round-topped ridge. The rear plow, I, opens a furrow in the bed, and the cotton-seed discharges into it through flexible spout $d$ and tube K. Said tube K is hinged similarly to the front tube, G. A fork, H', is attached to the tube for covering the seed.

The lateral bed-plows H have arms or beams $e$, by which they are hinged to the frame A, and said arms are connected by cross-bars $f$ to a bar, L, which has a flexible attachment to the guano and seed discharge tubes G K. From the middle of said bar L rises a vertical rack-bar, M, which passes through a slot in the tongue B and enters a box or guide, N, secured upon the latter in front of or in close contiguity to the driver's seat O.

The box or guide N has a slot in its upper part to receive the cog-wheel P, which meshes with the rack-bar M and is mounted on a crank-shaft, P'. By rotating the latter the driver is enabled to raise or lower the guano and seed tubes and the furrow-opener, bed-plows, and seed-coverer simultaneously.

The bottom of the guano-hopper is formed of two plate-springs, R, placed horizontally, and whose free front ends rest on toothed wheels S. The latter are so placed on the shaft T that their teeth alternate in position, so that the springs R are alternately raised, thus agitating the guano, breaking up the lumps, and allowing the pulverized or finely-divided portion to pass between the plates and discharge into the tubes and thus into the furrow.

A differential pulley, U, is fixed on the outer or projecting end of shaft T, and a band, V, passes from it to a pulley on shaft W, which has its bearings on the axle C, and has a gear-connection with one of the transporting-wheels X.

An agitator, Y, in the cotton-seed hopper E is connected with a crank on the inner end of shaft W. The rotation of wheel X imparts similar motion to shaft W, and thus reciprocates the agitator Y.

From the above-described construction and arrangement of parts, it will be seen that as the machine advances the plow opens a furrow, and the vibration of the spring-plates in the front hopper causes discharge of guano into said furrow. The side plows following throw up a bed and cover the guano with a thin layer of earth. The rear plow then opens a new furrow in the line of the first, and the seed is delivered into the furrow and covered by the fork. When the end of the field has been reached the driver throws the gearing out of action by a foot-lever and spring, (not shown,) and also rotates the shaft P', thus elevating the furrow-opener F, bed-plows, and coverer, and holding them in that position until the machine has been turned around and properly set for the return trip, when the furrow-opener, plows, &c., are lowered and the machine operates as before.

The amount of guano discharged in a given time may be regulated by changing the belt V on the differential pulleys, or by a set-screw, (not shown,) which may pass through the side of the hopper and press upon a movable plate so arranged as to narrow the orifice in the bottom of the hopper.

I am aware that a spring-plate, forming the bottom of the hopper of a planter or fertilizer-distributer, has been vibrated by contact with a toothed rotating wheel, and I do not claim such combination of parts.

What I claim is—

1. The combination of the hinged guano-conducting tube and its attached furrow-opener, the lateral bed-plows, the cotton-seed tube and coverer, the bar connecting said tubes and the cross-bars extending between the plow-beams, the rack-bar, gear, and crank-shaft, whereby the operation of the latter raises or lowers all the other parts simultaneously, as and for the purpose specified.

2. The combination of the toothed rollers, spring-plates, and guano-hopper, the agitator and cotton-seed hopper, the belt-pulleys and shaft, having a gear-connection with the transporting-wheel, all as shown and described.

JOHN WILLIAM FLETCHER GILREATH.

Witnesses:
W. W. MYERS,
W. E. LEAT,
J. P. HAWKS.